United States Patent [19]

Booher

[11] Patent Number: 4,893,832
[45] Date of Patent: Jan. 16, 1990

[54] DIHEDRAL COMPOSITE VEHICLE SUSPENSION

[75] Inventor: Benjamin V. Booher, Leucadia, Calif.

[73] Assignee: Suspension Group, Ltd., Encinitas, Calif.

[21] Appl. No.: 237,698

[22] Filed: Aug. 26, 1988

Related U.S. Application Data

[63] Continuation of Ser. No. 29,100, Mar. 23, 1987, abandoned, which is a continuation-in-part of Ser. No. 835,187, Mar. 3, 1986, abandoned, which is a continuation-in-part of Ser. No. 717,791, Mar. 29, 1985, abandoned, which is a continuation of Ser. No. 525,011, Aug. 22, 1983, Pat. No. 4,509,744.

[51] Int. Cl.⁴ .............................................. B60G 11/02
[52] U.S. Cl. .................................... 280/719; 280/688
[58] Field of Search ............... 280/669, 686, 688, 694, 280/719; 267/149

[56] References Cited

U.S. PATENT DOCUMENTS

| | | | |
|---|---|---|---|
| 2,635,894 | 4/1953 | Jackman | 280/96.2 |
| 3,002,742 | 10/1961 | Troy | 280/719 |
| 3,034,802 | 5/1962 | Axtmann | 280/96.2 |
| 3,917,306 | 11/1975 | Madler et al. | 280/719 |
| 4,313,618 | 2/1982 | Robinson | 280/719 |
| 4,540,197 | 9/1985 | Finn et al. | 280/697 |
| 4,557,500 | 12/1985 | Collard et al. | 280/669 |

OTHER PUBLICATIONS

PPG Industries Article Entitled "An Experiment in Weight Reduction . . . ", Two Pages, Undated.

Primary Examiner—Richard A. Bertsch
Attorney, Agent, or Firm—Baker, Maxham, Jester & Meador

[57] ABSTRACT

A vehicle suspension assembly comprises a transverse box beam for a vehicle chassis, a central mount on an underside of the box beam, a combination composite spring and transverse control arm member having a dihedral for establishing a pre-load of the suspension system for establishing the vehicle ride height mounted at the center thereof to the central mount for supporting wheel assemblies at the outer ends thereof.

5 Claims, 2 Drawing Sheets

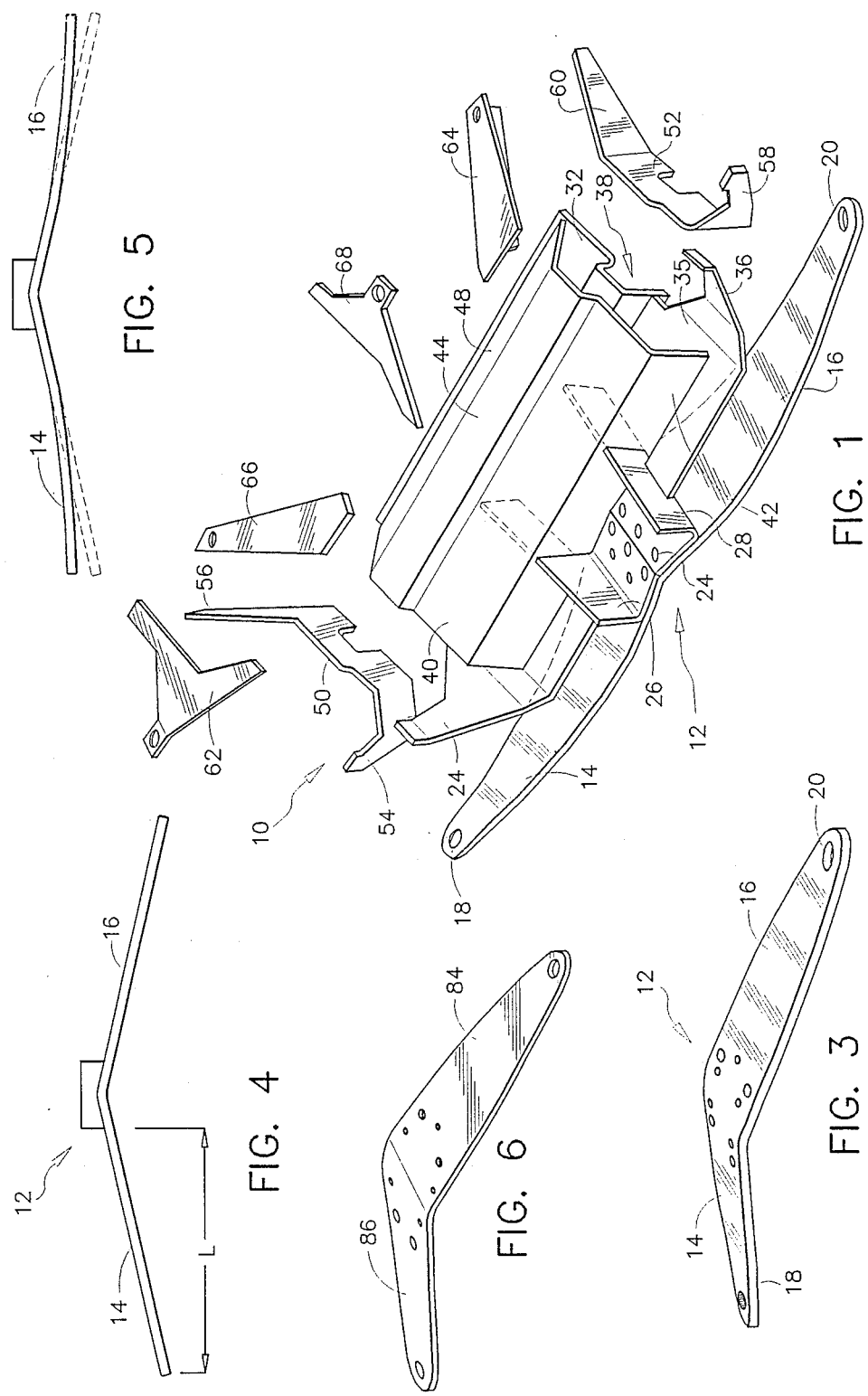

DIHEDRAL COMPOSITE VEHICLE SUSPENSION

CROSS-REFERENCE TO RELATED APPLICATIONS

This application is a continuation of application Ser. No. 07/029,100, filed Mar. 23, 1987, now abandoned, which is a Continuation-in-part of my co-pending U.S. Application Ser. No. 835,187, filed Mar. 3, 1986 entitled "Vehicle Suspension System with Flexible Control Arm", now abandoned, which is a Continuation-in-Part of my co-pending U.S. Application No. 717,791, filed Mar. 29, 1985 entitled "Vehicle Suspension System with Flexible Control Arm", now abandoned, which is in turn a Continuation of my earlier U.S. Patent Application Ser. No. 525,011, filed Aug. 22, 1983 entitled "Composite Control Arm Apparatus" now U.S. Pat. No. 4,509,744, granted Apr. 9, 1985.

BACKGROUND OF THE INVENTION

The present invention relates to vehicle suspension systems, and pertains more particularly to an automotive suspension system in which a composite elongate member, which functions as a spring and a control arm, has a dihedrel for establishing a pre-load of the spring for establishing the ride height of the vehicle.

Vehicle suspension systems have heretofore included shock absorbers, springs (coil, leaf, air or torsion bar), axle housing, torque arms, A-frames, anti-roll bars, stabilizers, and so forth. These components have been assembled in various combinations in an effort to produce the desired ride and handling characteristics of the vehicle.

In a typical suspension system, changes in the spacing between axles and the body/chassis due to uneven road and other similar conditions are cushioned by springs. System oscillations are limited by dampers which are usually called shock absorbers. The shock absorbers dissipate the energy stored in the springs by gradually forcing oil through restrictive orifices and valves. The flow resistance encountered by the oil results in compression and rebound forces which control the spring movement. The work done by the oil as it moves through the valves converts energy stored in the springs into heat which is dissipated from the shock absorbers into the surrounding air.

There is a continuing effort to reduce the manufacturing cost of automobiles. There is also a continuing effort to increase the mileage of automobiles through weight reduction. Both of the aforementioned efforts must not unduly sacrifice performance, road handling or reliability. Conventional suspension systems tend to have numerous expensive heavy metal parts. It is, therefore, desirable to reduce the cost, weight and complexity of existing suspension systems.

Automobile suspension systems have heretofore been provided which have incorporated composite leaf springs. See for example U.S. Pat. Nos. 4,540,197 and 4,557,500. These composite leaf springs have been constructed by molding glass or other reinforcing fibers and a resin or other binder into the desired shapes. Typically, such composite leaf springs have been made of a plurality of laminations. They have been molded or otherwise constructed with a particular curvature so that they assume a desired configuration under normal loading conditions. Thus, these types of composite leaf springs are relatively complex and expensive to construct.

In my prior applications I disclose a number of different composite suspension system structures. In those systems, a composite member served the dual function of a spring and a control arm.

It would be desirable to provide a vehicle suspension incorporating less expensive composite springs. Such a suspension system would also preferably incorporate a sway bar to limit body roll during cornering.

SUMMARY AND OBJECTS OF THE INVENTION

It is, therefore, the primary object of the present invention to provide an improved vehicle suspension system.

In accordance with a primary aspect of the present invention, a pair of elongate composite control arms are rigidly secured to a mount at the center axis of a vehicle and extend outward in a dihedral configuration establishing a pre-load of the suspension system.

BRIEF DESCRIPTION OF THE DRAWINGS

The above and other objects and advantages of the present invention will become apparent from the following description when read in conjunction with the accompanying drawings wherein:

FIG. 1 is an exploded view of a suspension system in accordance with the invention;

FIG. 3 is a perspective view of the suspension member;

FIG. 4 is a front elevation view of the member of FIG. 3 in an unloaded condition;

FIG. 5 is a view like FIG. 4 showing the member loaded;

FIG. 6 is a view like FIG. 3 of an alternate embodiment of the suspension member;

DETAILED DESCRIPTION OF A PREFERRED EMBODIMENT

Figure 8:
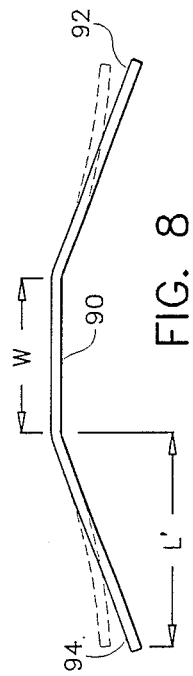
FIG. 8 is a front elevation view of the embodiment of FIG. 7 showing the unloaded and loaded conditions.

Referring to FIG. 1 of the drawings, there is illustrated a suspension assembly or system for supporting a vehicle body on laterally spaced wheel assemblies. The suspension system, as illustrated, is designed primarily for unitized body construction, but may be used with frame systems. The assembly may be used for rigid axle or for independently suspended wheels and may be either a front or rear suspension assembly.

The suspension system, in accordance with the invention, is designed to minimize weight and comprises a cross member or beam assembly designated generally by the numeral 12. The beam assembly 12 provides a mount for a suspension system, which comprises first and second arms 14 and 16 extending outward from a central mounting portion and terminating at mounting bores or the like 18 and 20 for attachment of wheel assemblies. The suspension arms are of a composite structure and preferably of the pultruded type, as described in my prior application, and essentially supplies the spring and the swing arms for the vehicle.

The transverse support beam unit 12 has its arms 14 and 16 formed in dihedral or inverted V-configuration with a wide section at the center and tapering down to a narrower section at the outer ends. The beam also preferably has a generally uniform thickness over its length. This provides a spring having the desired deflection characteristics, with the dihedral providing a pre-load or deflection for enabling a desired pre-load of the springs.

Figure 2:
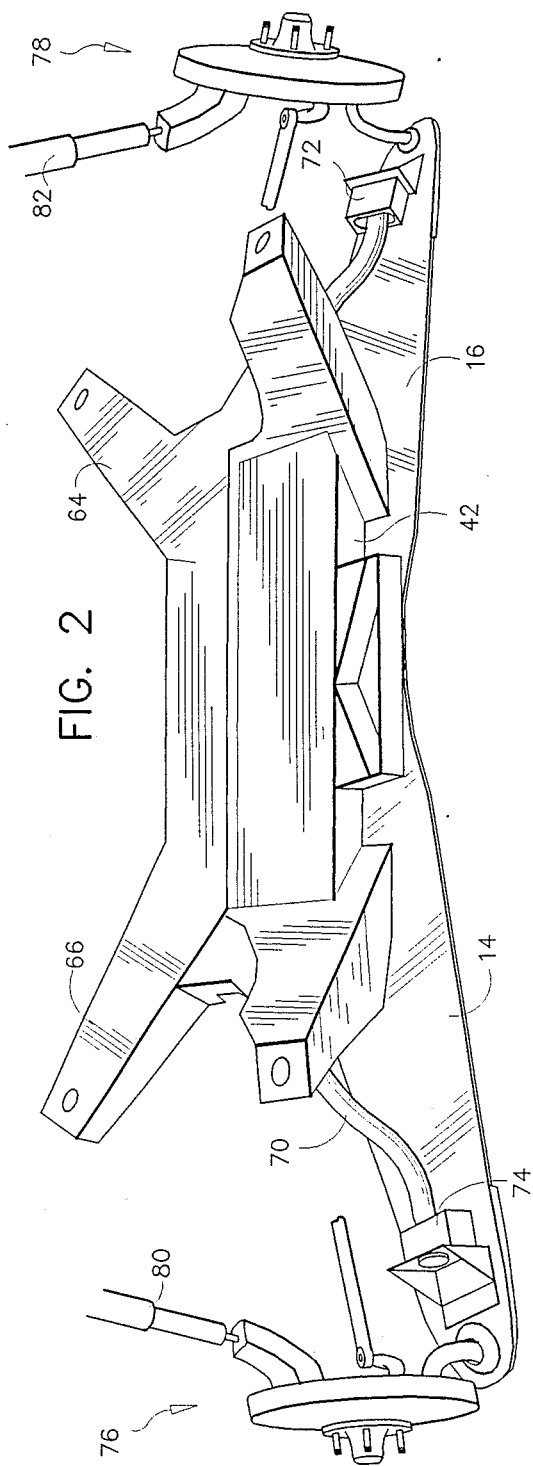
FIG. 2 is a direct front on view from above of the system of FIG. 1 assembled.

The transverse support beam or spring unit has a slightly inverted V-configuration as shown, for example, in FIGS. 3 and 4 and can be appreciated from FIGS. 1 and 2. This inverted configuration or dihedral provides a pre-load or pre-bias of the suspension system, which helps establish the ride height of the vehicle, as shown in FIG. 5. This enables a pre-load of the springs for a given weight vehicle body. When the vehicle body rests on the suspension system, it assumes the proper height and ground clearance.

The transverse beam assembly or spring unit is preferably constructed either as a two piece structure, as shown in FIG. 3, but may also be constructed as a unitary structure, as shown in FIG. 4. In either event, the assembly is secured at its proximate center to a center mount structure which comprises a box-like or channel beam extending forward from a transverse mount or support structure. The transverse support structure is in the form of an elongated hollow bore frame construction having top and bottom plates secured together by end and side panels. This provides a suspension unit that can be easily mounted by welding into a unitized body of an automobile or other vehicle. The box-like skin structure support of a unitized body, typically termed a monococque construction, provides a high strength and low weight for a given bulk of structure. The present suspension system enables further weight reduction in such vehicle construction.

The central mount unit to which the transverse beam assembly 12 is attached comprises a generally channel-like box structure having a generally V-shaped bottom 24 and upstanding sides 26 and 28. This central mount unit or member runs longitudinally of the vehicle along the central longitudinal axis thereof and is secured to the transverse mount assembly 10.

In the illustrated embodiment, the transverse mount assembly or structure comprises a combination forward and aft bottom plate 35 and 32, respectively, which are secured together such as by welding or the like. The forward plate 32 includes an arm 34 and 36 extending from each end thereof. The aft plate 32 is formed of a central channel, designated generally by the numeral 38, which provides vertical surfaces and a channel-like structure, which increases the strength thereof, and at the same time provides a channel or tunnel for receipt of a torsion bar as will be explained.

The top plate of the transverse mount structure 40 has a complex curvature, having a top generally planar section with a forward vertical wall, and a stepped up section to the rear of the planar section followed by a sloped rear wall 48 extending downward to and secured to the aft edge of the rear bottom plate 32. This entire structure forms a generally tubular box-like section having generally horizontal bottom panels spaced from the generally horizontal upper panel by side or fore and aft panels 42 and 48.

The transverse mount structure further includes mount arms extending from each end thereof formed by a combination of panels in the form of end panels 50 and 52, covering the ends of the box-like section and having fore and aft arms 54, 56, 58 and 60, which together with top panels 62 and 64 form forward outwardly extending arms. Rearwardly outward extending arms are formed by the combination of top plates 62 and 68 secured to the outward extending arms 66 and 64.

This assembly is welded together to form an assembled structure, as shown in FIG. 2, to which a torsion bar assembly has been added. The torsion bar assembly comprises a generally tubular torsion bar 70, which is mounted at its center in the tunnel 38 to the transverse mount structure and at its ends in mounting units 72 and 74, which are secured to the outer ends of the arms 14 and 16 of the transverse resilient beam or flexible beam.

The beams or control arms 14 and 16 form the lower arms or links as well as the springs of a wheel suspension assembly. The wheel assembly may be guided at the top by means or further arms or links or by a strut assembly both of which are illustrated in my aforementioned prior applications. The flexing of the control arm is determined by its geometry and by the material from which it is made.

A pair of wheel assemblies 76 and 78 are mounted on the outer ends of the arms 14 and 16, as shown in FIG. 2. The wheel assemblies each include the usual hub end spindle for detachably mounting wheels. The wheel assemblies are supported at the lower portion thereof by the arms and may be supported at the top by struts 80 and 82 or by arms (not shown). The composite arms 14 and 16 may be arranged to serve as the upper, lower or both arms of the system.

Referring to FIGS. 3–5, the beam 12 is shown as a unitary structure, having arms 14 and 16 which extend outward from a center portion thereof when it is mounted to support structure. The beam serves the function of a spring and a support arm for the wheel assemblies, as discussed in my prior applications. The beam of this construction has an arm length L, which is about one-half the track of the vehicle. This arm length can accommodate very large elevation variations of the wheels with very little lateral displacement of the wheel. The support beam 12 has a dihedral, which pre-loads the system so that the arms will deflect under normal load such, as shown in FIG. 5, to establish the normal ride height of the vehicle.

Referring to FIG. 6, an alternate embodiment is illustrated wherein the two arms 84 and 86 of the system are separate. This provides a system wherein the dihedral of the system can be varied by the initial mounting angle of the beams. The separate arms can also be separately replaced as needed.

Figure 7:
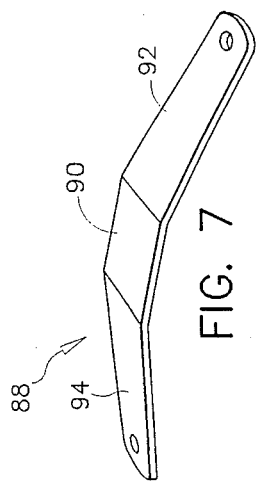
FIG. 7 is a view like FIG. 3 of another embodiment.

Referring to FIGS. 7 and 8 a further embodiment is illustrated wherein a beam 88 is formed with a center straight section 90 and arms 92 and 94 angled downward from the straight section. The beam can be constructed to vary the width W of the center section 90 in order to vary the characteristics of the beam. The length L of the arms can be made longer or shorter to vary the swing arc and other characteristics.

While I have illustrated and described my invention by means of specific embodiments, it is to be understood that numerous changes and modifications may be made therein without departing from the spirit and scope of the invention as defined in the appended claims.

I claim:

1. A vehicle suspension assembly for supporting a body of a vehicle on laterally spaced wheel assemblies, comprising:

an elongated transverse mount structure for mounting between the side structure of a vehicle body which comprises a generally tubular box-like section having a generally horizontal bottom panel and a vertically spaced upper panel, each said bottom panel and upper panel having at least one vertical surface;

a central mount mounted on the underside of said transverse mount structure substantially on a longitudinal centerline thereof, said central mount comprising a longitudinally extending channel with an inverted V-shape; and a combination spring and control arm assembly having a generally inverted V-configuration, secured to said central mount at said inverted V and comprising first and second arms formed of a composite material, each having a substantially uniform thickness along the length thereof extending in opposite directions from said central mount for supporting a wheel assembly at the outer end thereof for free vertical movement.

2. A system according to claim 1 wherein:
said spring and control arm assembly is of a unitary construction.

3. A system according to claim 1 wherein:
said spring and control arm assembly comprises separately detachable first and second arms.

4. A system according to claim 1 wherein:
said spring and control arm assembly comprises the lower control arm and spring for the suspension of the wheel assembly; and a shock absorber controls the upper portion of the wheel assembly.

5. A vehicle suspension assembly for supporting a body of a vehicle on laterally spaced wheel assemblies, comprising:

a transverse box beam for mounting between the sides of a vehicle chassis, including a cross member having a generally horizontal bottom panel and a vertically spaced upper panel, each having at least one vertical surface for supporting said mount to a vehicle body;

a central mount mounted on an underside of said box beam substantially on a longitudinal centerline of said vehicle chassis having a longitudinally extending inverted V-shaped channel; and a combination spring and transverse control arm assembly having a generally inverted V-configuration in the unloaded configuration secured to said central mount longitudinally extending inverted V-shaped channel and comprising first and second flexible arms formed of a composite material extending outward in opposite directions from said central mount for supporting a wheel assembly for free vertical movement.

* * * * *